(12) United States Patent
Chiu et al.

(10) Patent No.: US 8,385,235 B2
(45) Date of Patent: Feb. 26, 2013

(54) FULL DIVISION DUPLEX SYSTEM AND A LEAKAGE CANCELLATION METHOD

(75) Inventors: Chinq-Shiun Chiu, Hsinchu (TW); Chun-Pang Wu, Kaohsiung (TW)

(73) Assignee: Mediatek Inc., Hsin-Chu (TW)

(*) Notice: Subject to any disclaimer, the term of this patent is extended or adjusted under 35 U.S.C. 154(b) by 294 days.

(21) Appl. No.: 12/830,029

(22) Filed: Jul. 2, 2010

(65) Prior Publication Data

US 2010/0271987 A1 Oct. 28, 2010

Related U.S. Application Data

(63) Continuation of application No. 12/038,135, filed on Feb. 27, 2008, now Pat. No. 7,773,545.

(51) Int. Cl.
*H04J 13/00* (2011.01)

(52) U.S. Cl. ........................ 370/277; 370/342

(58) Field of Classification Search .................. 370/277, 370/281, 342

See application file for complete search history.

(56) References Cited

U.S. PATENT DOCUMENTS

| | | | |
|---|---|---|---|
| 6,961,552 B2 | 11/2005 | Darabi et al. | |
| 7,773,545 B2* | 8/2010 | Chiu et al. | 370/277 |
| 8,175,535 B2* | 5/2012 | Mu | 455/67.11 |
| 2006/0094361 A1 | 5/2006 | Darabi | |
| 2007/0217488 A1 | 9/2007 | Smaini et al. | |
| 2007/0264943 A1 | 11/2007 | Darabi | |
| 2008/0009258 A1* | 1/2008 | Safarian et al. | 455/307 |
| 2008/0242245 A1* | 10/2008 | Aparin | 455/126 |
| 2009/0017770 A1* | 1/2009 | Mirzaei et al. | 455/73 |
| 2009/0186582 A1* | 7/2009 | Muhammad et al. | 455/63.1 |

FOREIGN PATENT DOCUMENTS

TW 200511708 3/2005

OTHER PUBLICATIONS

A. Safarian et al., 'Integrated Blocker Filtering RF Front Ends', Radio Frequency Integrated Circuits Symposium, Jun. 2007, pp. 13-16.*
English language translation of abstract of TW 200511708 (published Mar. 16, 2005).

* cited by examiner

*Primary Examiner* — Melvin Marcelo
(74) *Attorney, Agent, or Firm* — McClure, Qualey & Rodack, LLP

(57) ABSTRACT

An exemplary embodiment of a full division duplex system comprises a receiver, a transmitter and an auxiliary circuit. The receiver receives an inbound RF signal of a first band to generate an inbound baseband signal, and the transmitter up converts an outbound baseband signal by an oscillation signal to generate an outbound RF signal of a second band for transmission. The auxiliary circuit calculates leakages from the outbound RF signal to generate a blocker replica, in which a LNA is coupled to a non-conductive coupling path extended from the input of receiver to collect leakages from the outbound RF signal to produce an induction signal. The induction signal is down converted to perform an adjustment, and thereafter up converted again to generate the blocker replica. In this way, the inbound baseband signal is generated from a subtraction of the inbound RF signal and the blocker replica.

26 Claims, 6 Drawing Sheets

FULL DIVISION DUPLEX SYSTEM AND A LEAKAGE CANCELLATION METHOD

CROSS REFERENCE TO RELATED APPLICATIONS

This application is a continuation of pending U.S. patent application Ser. No. 12/038,135, filed Feb. 27, 2008, now U.S. Pat. No. 7,773,545, the entirety of which are incorporated by reference herein.

BACKGROUND OF THE INVENTION

1. Field of the Invention

The invention relates to full division duplex (FDD) systems, and in particular, to methods and apparatuses for blocker filtering in a WCDMA system in which a transmitter and a receiver are simultaneously enabled.

2. Description of the Related Art

Referring to FIG. 1a, signal tones distributed on a frequency axis are shown. In wireless cellular systems, blockers originate from either a self transmitter, such as a WCDMA, or from a users' transmitter such as a GSM. As shown in FIG. 1a, a large blocker TX is always present when a weak desired signal RX is received. The blocker is typically a self transmitter in full division duplex (FDD) systems, such as a WCDMA, since the transmitter and receiver are simultaneously enabled. The blocker most often degrades the sensitivity of the receiver in three ways. First, the blocker could saturate the receiver, and secondly, the blocker could inter-modulate with strong jammers to generate in-band cross-modulation distortion (XMD). Thirdly, the blocker could generate low frequency $2^{nd}$-order inter-modulation distortion (IMD2) at baseband along with the desired received signal. Therefore, due to the blocking effects, integrated receiver design is stringently hindered.

Referring to FIG. 1b, a conventional FDD system 100 utilizing a surface acoustic wave (SAW) filter 105 is shown. In the FDD system 100, a duplexer 104 is deployed on the input of the receiver 110 to reject the out-of-band blockers by 45-55 dB on average, and also to scale down the transmitter 120 power amplifier (PA) noise floor to at least 10 dB below the thermal noise (kTB in 3.84 MHz bandwidth). To further lower the distortions generated by the blockers such as the signal tone TX in FIG. 1a, an off-chip RF SAW filter 105 with typically 20-25 dB blocker rejection is deployed in the receiver 110, coupled between a low noise amplifier (LNA) 112 and a down converter 116. The use of the SAW filter 105, however, introduces several drawbacks. First, they have 2-3 dB insertion loss at the desired receiver band. Secondly, the output of LNA 112 needs to be matched to the input impedance of the SAW filter 105, i.e. 50 ohm. To compensate for lower load resistance, the LNA 112 consumes more bias current to retain the high gain. Thirdly, the output of the SAW filter 105 needs to be matched to the input impedance of the proceeded stage, which is typically a down converter 116 whereby the mixer noise is further lowered. Finally the SAW filter 105 is an off-chip component that degrades the integration level of transceivers and increases costs. It is therefore necessary to develop an enhanced approach to substitute for the SAW filter 105.

BRIEF SUMMARY OF THE INVENTION

An exemplary embodiment of a full division duplex system comprises a receiver, a transmitter and an auxiliary circuit. The receiver receives an inbound RF signal of a first band to generate an inbound baseband signal, and the transmitter up converts an outbound baseband signal by an oscillation signal to generate an outbound RF signal of a second band for transmission. The auxiliary circuit calculates leakages from the outbound RF signal to generate a blocker replica, in which a LNA is coupled to a non-conductive coupling path extended from the input of the receiver to collect leakages from the outbound RF signal to produce an induction signal. The induction signal is down converted to perform an adjustment, and thereafter up converted again to generate the blocker replica. In this way, the inbound baseband signal is generated from a subtraction of the inbound RF signal and the blocker replica.

The auxiliary circuit may further comprise a buffer, buffering the oscillation signal sent from the transmitter for use of the up converter and first down converter. The full division duplex system further comprises an antenna and a duplexer coupled to the antenna, providing a shared path for the receiver and the transmitter to transmit the outbound RF signal and receive the inbound RF signal.

An embodiment of the adjustment circuit comprises a phase shifter, adjusting phase imbalances of inphase and quadrature parts of the preliminary baseband signal. A gain tuner then adjusts gain imbalances of inphase and quadrature parts of the preliminary baseband signal. A low pass filter (LPF) is coupled to the gain tuner, filtering inphase and quadrature parts of the preliminary baseband signal to generate the adjusted baseband signal. A DC offset canceller is also deployed in the adjustment circuit, canceling DC offsets of the preliminary baseband signal.

Further embodiments of the FDD system are provided, along with leakage cancellation methods implemented thereby, and detailed descriptions are to be given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 2b shows an embodiment of the adjustment circuit 210 in FIG. 2a; and

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
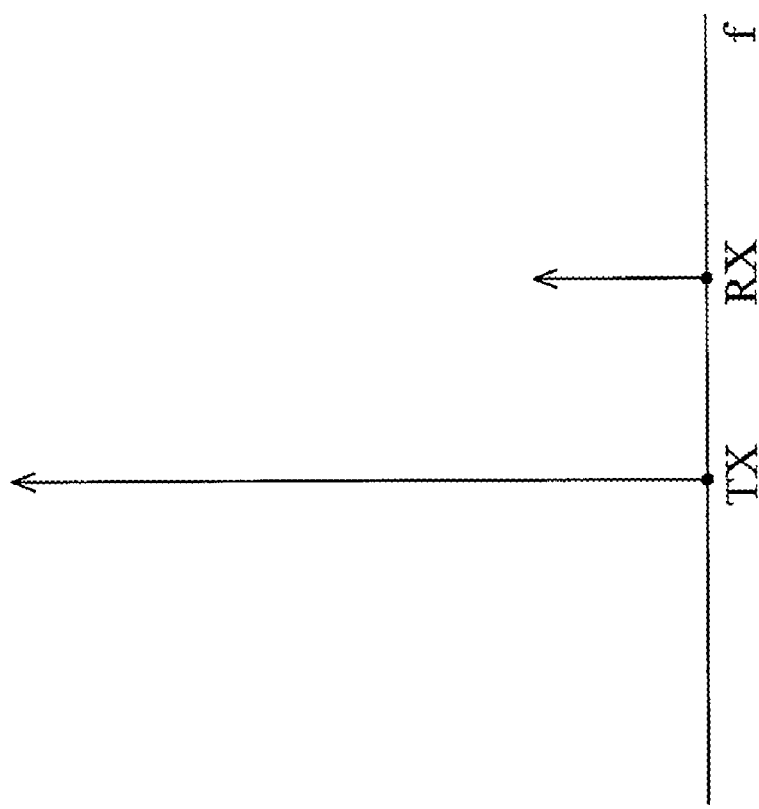
FIG. 1a shows a conventional FDD system 100 utilizing a SAW filter 105.
Figure 1B:
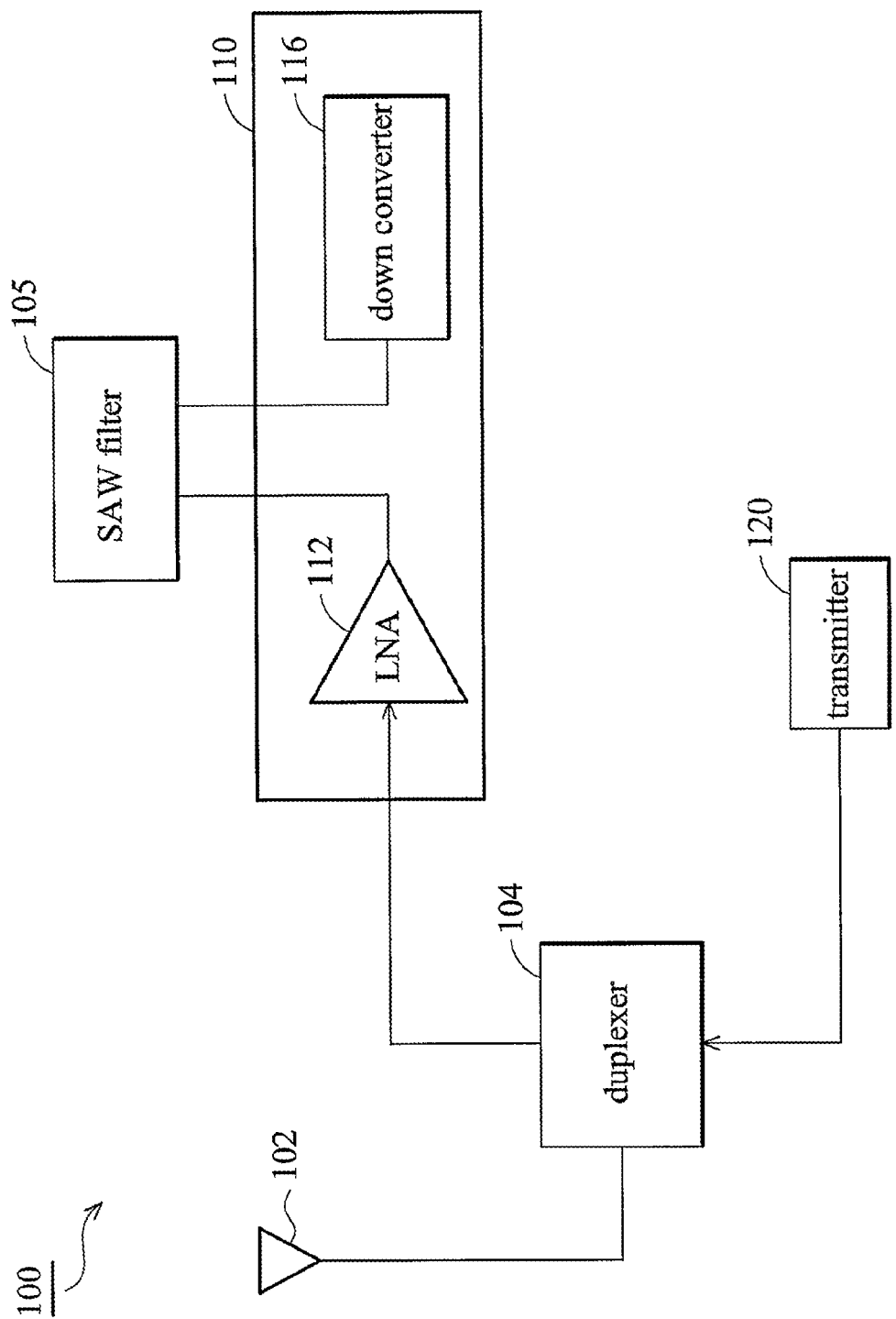
FIG. 1b shows signal tones distributed on a frequency axis.
Figure 2A:
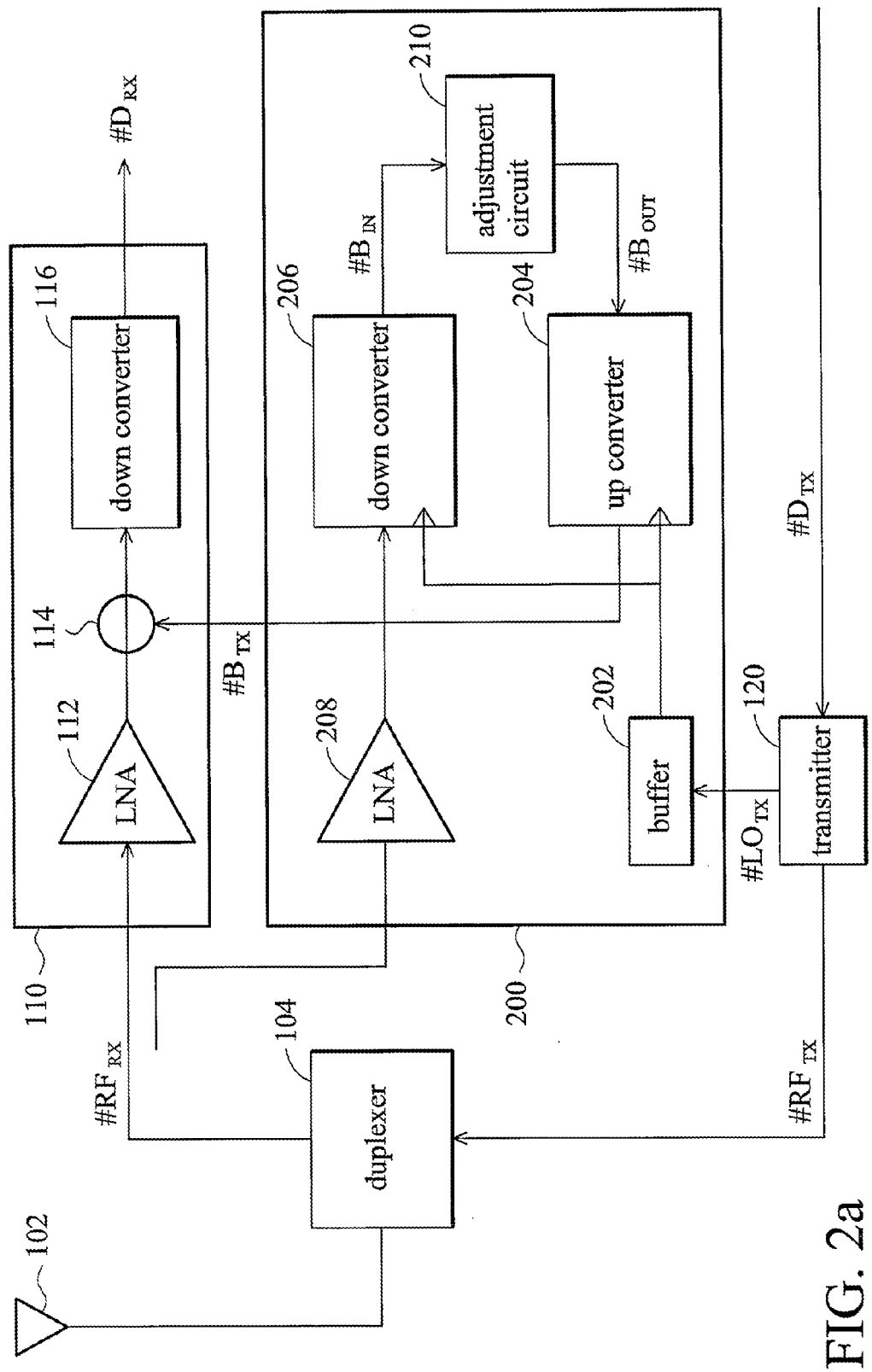
FIG. 2a shows an embodiment of a FDD system according to the invention.

Referring to FIG. 2a, an embodiment of a FDD system according to the invention is shown. The FDD system comprises a receiver 110 and a transmitter 120 sharing an antenna 102 via a duplexer 104. While the transmitter 120 up converts an outbound baseband signal #$D_{TX}$ by an oscillation signal #$LO_{TX}$ to generate an outbound RF signal #$RF_{TX}$ of a second band for transmission, the receiver 110 is simultaneously enabled to receive an inbound RF signal #$RF_{RX}$ of a first band to generate an inbound baseband signal #$D_{RX}$. A duplexer 104 is coupled to the antenna 102, providing a shared path for the receiver 110 and the transmitter 120 to transmit the outbound RF signal #$RF_{TX}$ and receive the inbound RF signal #$RF_{RX}$. Leakages of the outbound RF signal #$RF_{TX}$ may cause a large blocker TX as shown in FIG. 1a that passes through the duplexer 104 to the receiver 110. To solve the problem, an auxiliary circuit 200 is deployed to substitute for the SAW filter 105 in FIG. 1b to cancel the leakage in an efficient way, comprising a buffer 202, an up converter 204, a down converter 206, a LNA 208 and an adjustment circuit 210. When the auxiliary circuit 200 is activated, leakages from the outbound RF signal #$RF_{TX}$ are first collected through a non-conductive coupling path extended from the input of receiver 110, and through the LNA 208, an induction signal is thereby generated. Thereafter, a first down converter 206 uses the oscillation signal #$LO_{TX}$ shared from the transmitter 120 to down convert the induction signal to a preliminary baseband signal #$B_{IN}$, and the adjustment circuit 210 optimizes the preliminary baseband signal #$B_{IN}$ to output an adjusted baseband signal #$B_{OUT}$ in which unwanted terms such as phase imbalances, gain imbalances and out-of-band noises are filtered. The up converter 204 is coupled to the adjustment circuit 210, up converting the adjusted baseband signal #$B_{OUT}$ by the oscillation signal #$LO_{TX}$ to generate a blocker replica #$B_{TX}$ as an estimation of the blocker. The blocker replica #$B_{TX}$ is then sent to receiver 110 for cancellation, thereby an inbound baseband signal #$D_{RX}$ without blocker interference is generated.

In the receiver 110, a LNA 112 amplifies the inbound RF signal #$RF_{RX}$ with low noise figures, while a down converter 116 serves for down conversion of the inbound RF signal #$RF_{RX}$. Before the LNA 112 outputs the amplified inbound RF signal #$RF_{RX}$ to the down converter 116, an adder 114 subtracts the amplified inbound RF signal #$RF_{RX}$ by the blocker replica #$B_{TX}$ sent from the auxiliary circuit 200, such that the inbound baseband signal #$D_{RX}$ obtained from the output of adder 114 is subsequently blocker free.

Since leakage cancellation is only required when receiving signals, the auxiliary circuit 200 may be disabled while the receiver 110 is not enabled. The auxiliary circuit 200 may further comprise a buffer 202 to buffer the oscillation signal #$LO_{TX}$ shared from the transmitter 120 for use of the up converter 204 and first down converter 206. The activation of buffer 202 is dependent on transmission power of the outbound RF signal #$RF_{TX}$. For example, when transmission power of the outbound RF signal #$RF_{TX}$ exceeds a threshold, the buffer 202 is enabled to function. Conversely, when the transmission power goes below the threshold, the buffer 202 is turned off.

Figure 2B:
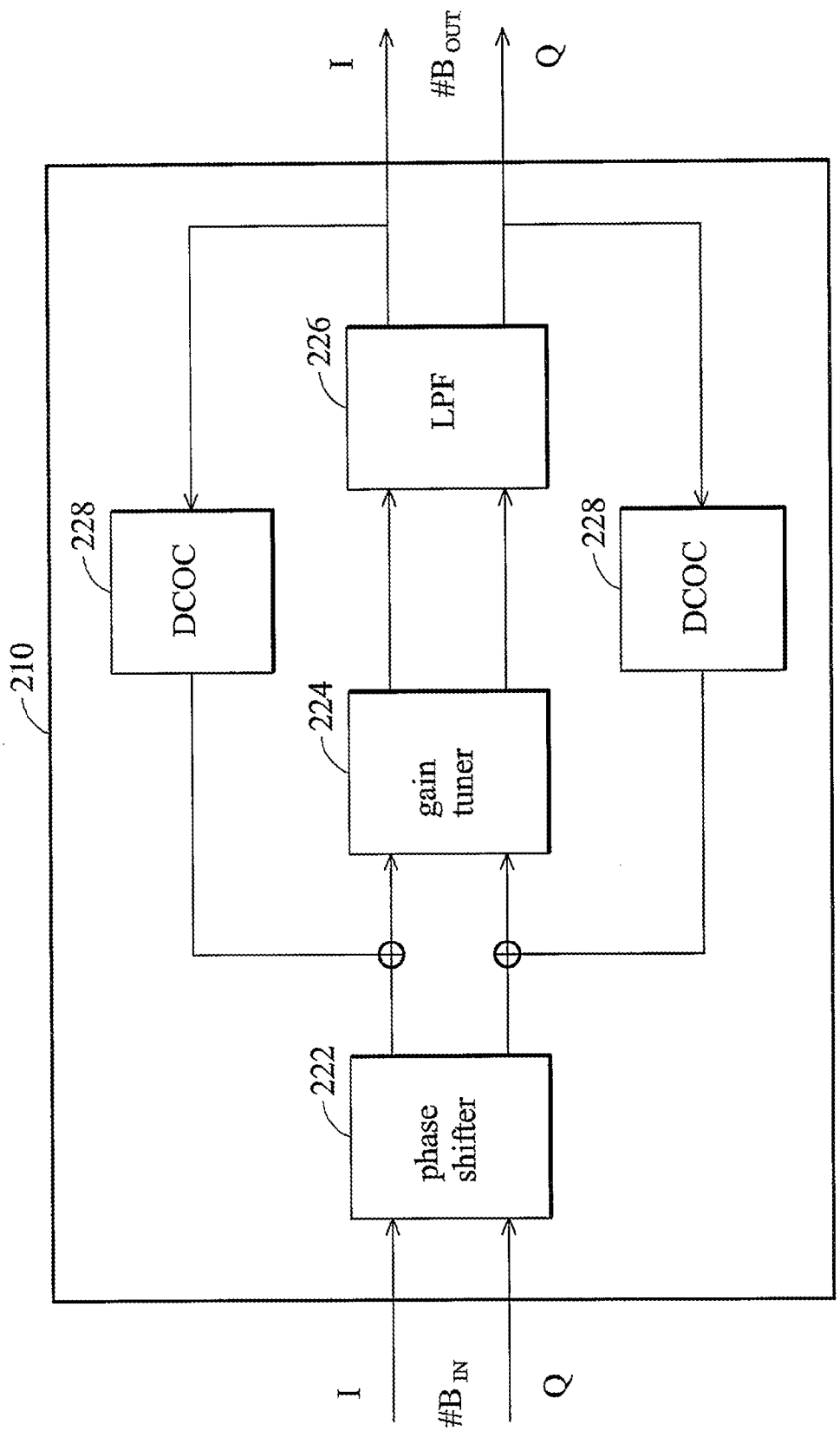

Referring to FIG. 2b, an embodiment of the adjustment circuit 210 in FIG. 2a is shown. An exemplary method to mitigate unwanted terms in the preliminary baseband signal #$B_{IN}$ is described. In practice, the preliminary baseband signal #$B_{IN}$ as well as the adjusted baseband signal #$B_{OUT}$ is actually delivered in two parts, inphase and quadrature parts. The adjustment circuit 210 comprises a phase shifter 222, a gain tuner 224, a LPF 226 and a DC offset canceller 228. The phase shifter 222 receives the preliminary baseband signal #$B_{IN}$ from the first down converter 206, and adjusts phase imbalances of inphase and quadrature parts thereof. The gain tuner 224 then adjusts gain imbalances of the inphase and quadrature parts, and the following LPF 226 performs a low pass filtration to eliminate unwanted out-of-band noises therein, thereby the adjusted baseband signal #$B_{OUT}$ is generated. Furthermore, a DC offset canceller 228 is deployed on the output of LPF 226 to detect DC offset of the adjusted baseband signal #$B_{OUT}$. The DC offset may be feedback and cancelled at the input stage of gain tuner 224. In this way, blocker is first down converted to be efficiently filtered in DC or low IF, and then up converted again to be subtracted in the receiver 110.

Figure 3:
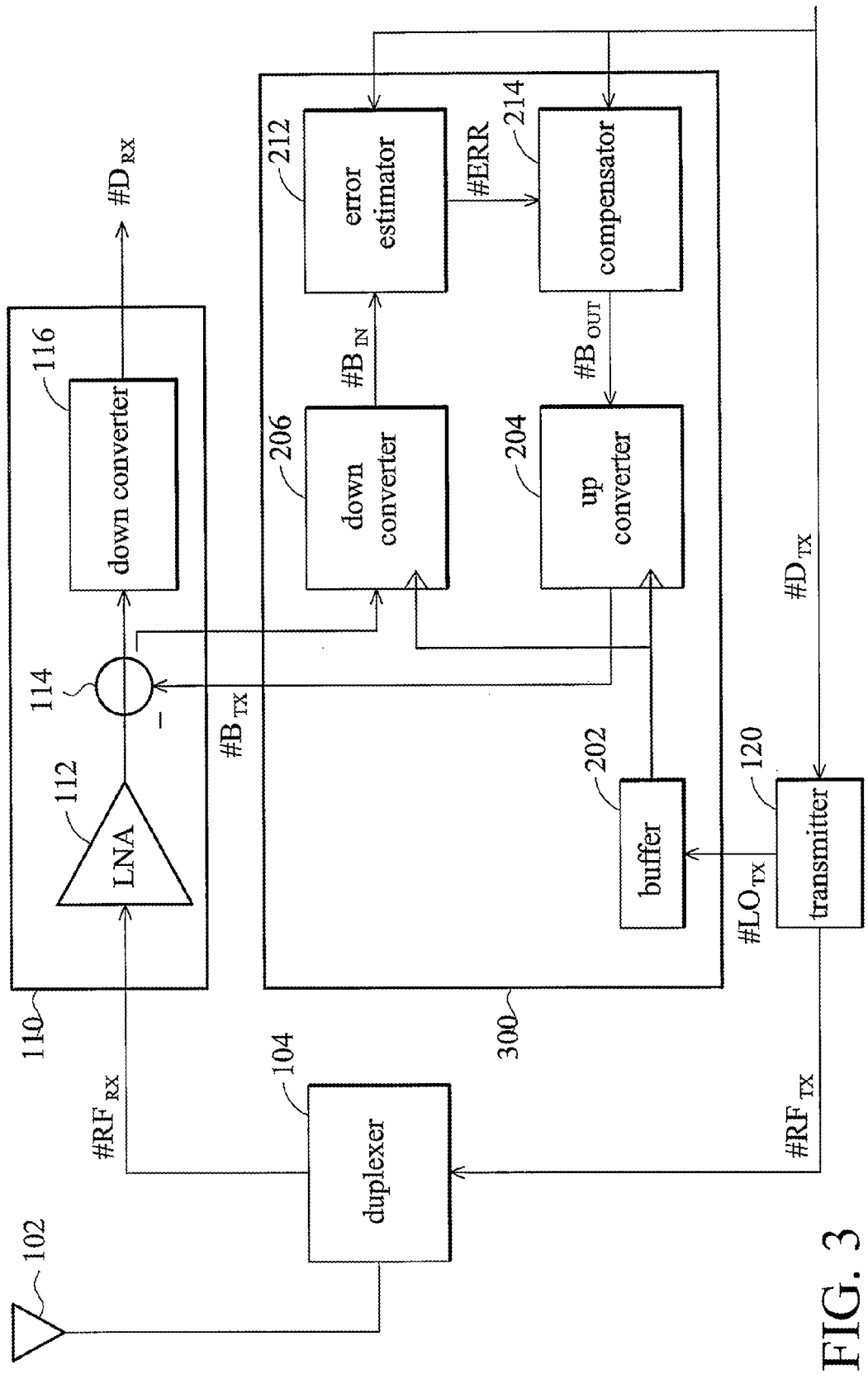
FIGS. 3 and 4 show further embodiments of FDD systems according to the invention.

Referring to FIG. 3, an alternative implementation of the FDD system is shown. The outbound baseband signal #$D_{TX}$ and the induction signal are cooperatively used to calculate the blocker replica #$B_{TX}$, such that a loop is formed between the receiver 110 and auxiliary circuit 300 to recursively update the blocker replica #$B_{TX}$ while normal operation proceeds. This is referred to as an on-line leakage cancellation mode. The auxiliary circuit 300 is slightly modified from the auxiliary circuit 200, in which additional error estimator 212 and compensator 214 are deployed while the LNA 208 and adjustment circuit 210 are removed. Unlike the auxiliary circuit 200 in FIG. 2a, a non-conductive coupling path is established in a different path extending from the output of adder 114 to the input of first down converter 206. The induction signal is therefore obtained in this way, and is directly down converted by the first down converter 206 to generate a preliminary baseband signal #$B_{IN}$. The error estimator 212 is coupled to the first down converter 206, comparing the preliminary baseband signal #$B_{IN}$ with the outbound baseband signal #$D_{TX}$ to estimate path delay, phase imbalance and gain error of the leakages from the outbound RF signal #$RF_{TX}$. The estimation results are represented in a set of error parameters #ERR. In the embodiment, the blocker replica #$B_{TX}$ is generated from the outbound baseband signal #$D_{TX}$. First, the compensator 214 compensates the path delay, phase imbalance and gain error in the outbound baseband signal #$D_{TX}$ according to the set of error parameters #ERR, and generates an adjusted baseband signal #$B_{OUT}$ for up conversion in the up converter 204. The up converter 204 uses the oscillation signal #$LO_{TX}$ to up convert the adjusted baseband signal #$B_{OUT}$, and such that the blocker replica #$B_{TX}$ is generated. Similar to the embodiment of FIG. 2a, an adder 114 is deployed in the receiver 110 to subtract the inbound RF signal #$RF_{RX}$ by the blocker replica #$B_{TX}$. In this way, the down conversion performed by down converter 116 renders a blocker free result, the inbound baseband signal #$D_{RX}$.

Figure 4:
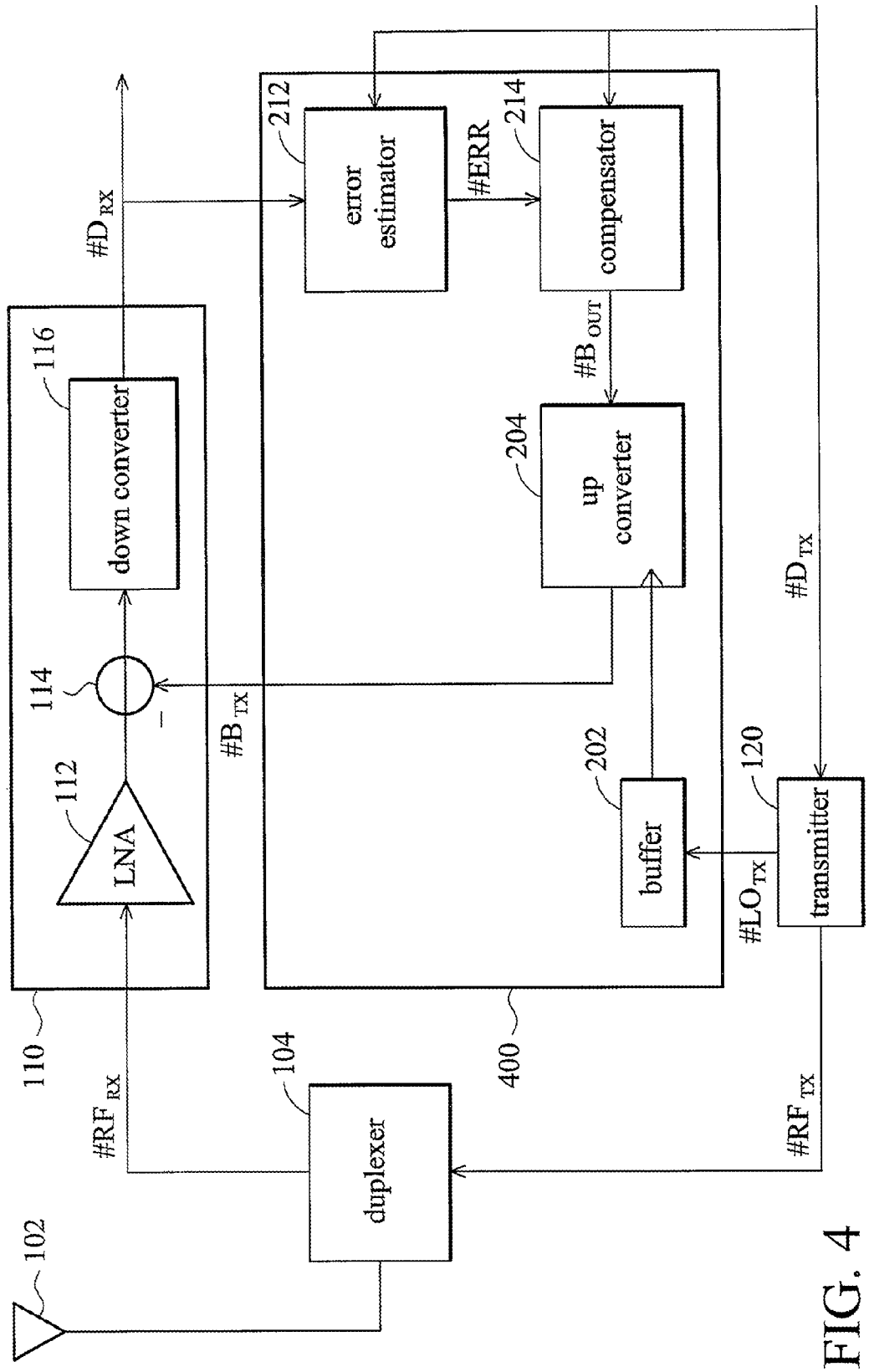

Referring to FIG. 4, a further embodiment of the FDD system operating in a calibration mode and a normal mode is shown. The blocker replica #$B_{TX}$ is also generated from the outbound baseband signal #$D_{TX}$, however, the error parameter #ERR is obtained from the output of receiver 110 in the calibration mode. Since the error parameter #ERR is only calculated once in the calibration mode, this approach is also referred to as an off-line leakage cancellation mode. The FDD system comprises a receiver 110 receiving an inbound RF signal #$RF_{RX}$ of a first band to generate an inbound baseband signal #$D_{RX}$, and a transmitter 120 up converting an outbound baseband signal #$D_{TX}$ by an oscillation signal #$LO_{TX}$ to generate an outbound RF signal #$RF_{TX}$ of a second band for transmission. An auxiliary circuit 400 is deployed between the receiver 110 and transmitter 120. First, the FDD system is initialized in the calibration mode. The transmitter 120 is enabled to up convert a calibration outbound baseband signal #$D_{Tx}$ by an oscillation signal #$LO_{Tx}$ to generate a calibration outbound RF signal #$RF_{TX}$ of a second band. Simultaneously, the receiver 110 is also enabled to down convert leakage of the calibration outbound RF signal #$RF_{TX}$ passed through the duplexer 104, and thereby generate a calibration inbound baseband signal #$D_{RX}$. The error estimator 212 is coupled to the output of receiver 110, receiving the calibration inbound baseband signal #$D_{RX}$ to perform a comparison with the outbound baseband signal #$D_{TX}$. In this way, leakage figures such as path delay, phase imbalance and gain error are efficiently estimated and parameterized into a set of error parameters #ERR. As the error parameters #ERR are generated, the calibration mode is concluded, followed by a normal mode operation. In the normal mode, the error estimator 212 is disabled whereas the up converter 204 and compensator 214 are enabled. While the transmitter 120 is initialized to up convert an outbound baseband signal #$D_{TX}$ for transmission, the compensator 214 uses the error parameters #ERR to compensate the outbound baseband signal #$D_{TX}$ and generate an adjusted baseband signal #$B_{OUT}$ to the up converter 204. The up converter 204 then up converts the adjusted baseband signal #$B_{OUT}$ by the oscillation signal #$LO_{TX}$ to generate the blocker replica #$B_{TX}$. In the receiver 110, an inbound RF signal #$RF_{RX}$ is received and amplified in the LNA 112, and the adder 114 subtracts the amplified inbound RF signal #$RF_{RX}$ by the blocker replica #$B_{TX}$. Finally, the down converter 116 down converts the subtraction result to output a blocker free inbound baseband signal #$D_{RX}$.

The embodiments are particularly adaptable to WCDMA systems in which receiver 110 and transmitter 120 are often enabled simultaneously. The use of a conventional SAW filter 105 is omitted; thereby various advantages are gained while disadvantages are avoided. Since the preliminary baseband signal #$B_{IN}$ is a digital signal in baseband, the implementations of error estimator 212 and compensator 214 to fine tune the signal figures are easy, flexible and programmable.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A full division duplex system, comprising:
   a transmitter, up converting an outbound baseband signal by an oscillation signal to generate an outbound RF signal of a first band;
   an auxiliary circuit, generating a blocker replica associated with leakages from the outbound RF signal by the oscillation signal of the transmitter, wherein the auxiliary circuit is configured to receive the outbound baseband signal and perform a comparison according to the outbound baseband signal to generate a set of error parameters for compensating the outbound baseband signal; and
   a receiver, receiving an inbound RF signal of a second band and subtracting the blocker replica from the received inbound RF signal, wherein the receiver uses a different oscillation signal from the oscillation signal used by the transmitter and auxiliary circuit.

2. The full division duplex system as claimed in claim 1, wherein the auxiliary circuit is arranged to calculate the leakages from the outbound RF signal to generate a first baseband signal, and up convert the first baseband signal by the oscillation signal to generate the blocker replica.

3. The full division duplex system as claimed in claim 2, wherein the auxiliary circuit is arranged to produce an induction signal according to the leakages from the outbound RF signal, down convert the induction signal by the oscillation signal to generate a preliminary baseband signal, and adjust the preliminary baseband signal to generate the first baseband signal.

4. The full division duplex system as claimed in claim 3, wherein the auxiliary circuit is arranged to adjust at least one of phase, gain and DC offset of the preliminary baseband signal to generate the first baseband signal.

5. The full division duplex system as claimed in claim 2, wherein the auxiliary circuit is arranged to receive an induction signal from the receiver, and down convert the induction signal by the oscillation signal to generate a preliminary baseband signal, compare the preliminary baseband signal with the outbound baseband signal for the transmitter to calculate the set of error parameters, wherein the set of error parameters indicate path delay, phase imbalance and gain error of the leakages from the outbound RF signal, and compensate the outbound baseband signal according to the error parameters to generate the first baseband signal.

6. The full division duplex system as claimed in claim 2, wherein the receiver is further arranged to down convert a subtraction result of the received inbound RF signal and the blocker replica to generate an inbound baseband signal.

7. The full division duplex system as claimed in claim 6, wherein the auxiliary circuit is arranged to compare the inbound baseband signal with the outbound baseband signal to calculate the set of error parameters, wherein the set of error parameters indicate path delay, phase imbalance and gain error of the leakages from the outbound RF signal, and compensate the outbound baseband signal according to the error parameters to generate the first baseband signal.

8. A leakage cancellation method for a full division duplex system in which a transmitter and a receiver are simultaneously enabled, comprising:
   up converting an outbound baseband signal by an oscillation signal of the transmitter to generate an outbound RF signal of a first band;
   generating a blocker replica associated with leakages from the outbound RF signal by the oscillation signal, wherein generating the block replica comprises receiving the outbound baseband signal and performing a comparison according to the outbound baseband signal to generate a set of error parameters for compensating the outbound baseband signal;
   receiving an inbound RF signal of a second band by the receiver; and
   subtracting the blocker replica from the received inbound RF signal, wherein the receiver uses a second oscillation signal that is different from the oscillation signal of the transmitter.

9. The leakage cancellation method as claimed in claim 8, wherein generation of the blocker replica comprises:
   calculating the leakages from the outbound RF signal to generate a first baseband signal; and
   up converting the first baseband signal by the oscillation signal to generate the blocker replica.

10. The leakage cancellation method as claimed in claim 9, wherein generation of the first baseband signal comprises:
    collecting the leakages from the outbound RF signal by a non-conductive coupling path extended from an input of the receiver to produce an induction signal;
    down converting the induction signal by the oscillation signal of the transmitter to generate a preliminary baseband signal; and
    adjusting the preliminary baseband signal to output the first baseband signal.

11. The leakage cancellation method as claimed in claim 10, wherein adjustment of the preliminary baseband signal comprises adjusting at least one of phase, gain and DC offset of the preliminary baseband signal to generate the first baseband signal.

12. The leakage cancellation method as claimed in claim 9, further comprising down converting a subtraction result of the received inbound RF signal and the blocker replica to generate an inbound baseband signal.

13. The leakage cancellation method as claimed in claim 12, wherein generation of the first baseband signal comprises:
receiving the subtraction result of the received inbound RF signal and the blocker replica to serve as an induction signal;
down converting the induction signal by the oscillation signal of the transmitter to generate a preliminary baseband signal;
comparing the preliminary baseband signal with the outbound baseband signal for the transmitter to calculate the set of error parameters, wherein the set of error parameters indicate path delay, phase imbalance and gain error of the leakages from the outbound RF signal; and
compensating the outbound baseband signal by the error parameters to generate the first baseband signal.

14. The leakage cancellation method as claimed in claim 12, wherein generation of the first baseband signal comprises:
comparing the inbound baseband signal with the outbound baseband signal for the transmitter to calculating the set of error parameters, wherein the set of error parameters indicate path delay, phase imbalance and gain error of the leakages from the outbound RF signal; and
compensating the outbound baseband signal according to the error parameters to generate the first baseband signal.

15. A full division duplex system, comprising:
a receiver, receiving an inbound RF signal of a first band to generate an inbound baseband signal;
a transmitter, up converting an outbound baseband signal by an oscillation signal to generate an outbound RF signal of a second band; and
an auxiliary circuit, having a first signal path from the transmitter which is arranged to receive the oscillation signal of the transmitter and a second signal path from the receiver which is arranged to obtain information associated with leakages from the outbound RF signal, and generating a blocker replica according to the oscillation signal and the obtained information, wherein the auxiliary circuit is configured to receive the outbound baseband signal and perform a comparison according to the outbound baseband signal to generate a set of error parameters for compensating the outbound baseband signal;
wherein the receiver is arranged to subtract the blocker replica from the received inbound RF signal, wherein the receiver uses a different oscillation signal from the oscillation signal used by the transmitter and auxiliary circuit.

16. The full division duplex system as claimed in claim 15, wherein the receiver is further arranged to down convert a subtraction result of the received inbound RF signal and the blocker replica to generate the inbound baseband signal.

17. The full division duplex system as claimed in claim 15, wherein the second signal path is a non-conductive coupling path extended from the input of the receiver to a low noise amplifier in the auxiliary circuit, and is arranged to collect the leakages from the outbound RF signal.

18. The full division duplex system as claimed in claim 15, wherein the first signal path is arranged to transmit the oscillation signal of the transmitter to a down converter and an up converter in the auxiliary circuit.

19. The full division duplex system as claimed in claim 15, wherein the second signal path is a non-conductive coupling path arranged to transmit an indication signal with the information from an output of a low noise amplifier in the receiver to an input of an up converter in the auxiliary circuit.

20. The full division duplex system as claimed in claim 15, wherein the auxiliary circuit further comprises a third signal path connected to an input of the transmitter, and the third signal path is arranged to receive the outbound baseband signal.

21. The full division duplex system as claimed in claim 15, wherein the second signal path is arranged to transmit the inbound baseband signal from the receiver to an error estimator in the auxiliary circuit, and the first signal path is arranged to transmit the oscillation signal of the transmitter to an up down converter in the auxiliary circuit.

22. A leakage cancellation method for a full division duplex system in which a transmitter and a receiver are simultaneously enabled, comprising:
receiving an oscillation signal of the transmitter by a first signal path from the transmitter;
obtaining information associated with leakages from an outbound RF signal of a first band generated by the transmitter by a second signal path from the receiver;
generating a blocker replica according to the oscillation signal and the obtained information, wherein generating the block replica comprises receiving an outbound baseband signal and performing a comparison according to the outbound baseband signal to generate a set of error parameters for compensating the outbound baseband signal; and
subtracting the blocker replica from an inbound RF signal of a second band received by the receiver, wherein the receiver uses a second oscillation signal that is different than the oscillation signal of the transmitter.

23. The leakage cancellation method as claimed in claim 22, wherein the obtainment of the information associated with leakages from the outbound RF signal comprises:
collecting the leakages from the outbound RF signal by a non-conductive coupling path extended from an input of the receiver to produce an induction signal with the information.

24. The leakage cancellation method as claimed in claim 22, further comprising down converting a subtraction result of the inbound RF signal and the blocker replica to generate an inbound baseband signal.

25. The leakage cancellation method as claimed in claim 24, wherein obtainment of the information associated with leakages from the outbound RF signal comprises:
receiving the subtraction result of the received inbound RF signal and the blocker replica by a non-conductive coupling path extended from the receiver to serve as an induction signal with the information.

26. The leakage cancellation method as claimed in claim 24, wherein the obtainment of the information associated with leakages from the outbound RF signal comprises:
receiving the inbound baseband signal by the second signal path from the receiver;
receiving the outbound baseband signal for the transmitter by a third signal path connected to an input of the transmitter; and
comparing the inbound baseband signal with the outbound baseband signal to obtain a set of error parameters with the information.

* * * * *